US012760789B2

(12) United States Patent
Hoppe et al.

(10) Patent No.: US 12,760,789 B2
(45) Date of Patent: Oct. 13, 2026

(54) TRANSMISSION HOUSING AND VEHICLE TRANSMISSION

(71) Applicant: ZF Friedrichshafen AG, Friedrichshafen (DE)

(72) Inventors: Ronny Hoppe, Oberteuringen (DE); Hermann Lanz, Frickingen (DE); Frank Sauter, Meckenbeuren (DE); Andreas Reisch, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/888,383

(22) Filed: Sep. 18, 2024

(65) Prior Publication Data

US 2025/0102056 A1 Mar. 27, 2025

(30) Foreign Application Priority Data

Sep. 21, 2023 (DE) ..................... 10 2023 209 202.6

(51) Int. Cl.
*F16H 57/02* (2012.01)
*F16H 57/027* (2012.01)

(52) U.S. Cl.
CPC .................................. *F16H 57/027* (2013.01)

(58) Field of Classification Search
CPC ..................................................... F16H 57/027
See application file for complete search history.

(56) References Cited

U.S. PATENT DOCUMENTS

| | | | | |
|---|---|---|---|---|
| 9,822,867 | B2 | 11/2017 | Ito et al. | |
| 2010/0116087 | A1 | 5/2010 | Mueller | |
| 2020/0318727 | A1* | 10/2020 | Ege | F16H 57/0461 |
| 2025/0155011 | A1* | 5/2025 | Etges | F16H 57/0424 |

FOREIGN PATENT DOCUMENTS

| | | | | |
|---|---|---|---|---|
| CN | 113154014 A * | 7/2021 | | F16H 57/027 |
| DE | 4300441 C1 | 12/1993 | | |
| DE | 10 2008 043 629 A1 | 5/2010 | | |
| DE | 102009049608 A1 * | 6/2010 | | F16H 57/027 |
| DE | 102017129586 A1 * | 6/2019 | | F16H 57/027 |
| DE | 102019204907 A1 * | 10/2020 | | F16H 57/027 |
| DE | 10 2020 106 551 | 6/2021 | | |
| JP | 9-273621 | 10/1997 | | |
| JP | 2011179648 A * | 9/2011 | | F16H 57/027 |
| KR | 19980040751 U * | 9/1998 | | F16H 61/0021 |
| KR | 20110100165 A * | 9/2011 | | |

OTHER PUBLICATIONS

Machine translation of KR 20110100165 A obtained on Jun. 13, 2025.*

German Patent Office, German Search Report issued in German Patent application No. 10 2023 209 202.6 (May 6, 2024).

* cited by examiner

*Primary Examiner* — Adam D Rogers

(74) *Attorney, Agent, or Firm* — Secant IP, P.L.L.C.

(57) ABSTRACT

A transmission housing (1) for a motor vehicle, the transmission housing (1) defining an inside space (2) for accommodating moving transmission components and having a venting arrangement (3) for venting the inside space (2) relative to a surrounding atmosphere. The venting arrangement (3) has a venting duct (8) with a venting duct inlet (12) on the inside-space side. The venting arrangement (3) has a collection space (9) upstream from the venting duct inlet (12) with a collection space outlet (11). Also disclosed is a motor vehicle with moving transmission components and a transmission housing (1) of the type described.

10 Claims, 1 Drawing Sheet

TRANSMISSION HOUSING AND VEHICLE TRANSMISSION

RELATED APPLICATIONS

This application claims the benefit of and right of priority under 35 U.S.C. § 119 to German Patent Application no. 10 2023 209 202.6, filed on 21 Sep. 2023, the contents of which are incorporated herein by reference in its entirety

FIELD OF THE DISCLOSURE

The invention relates to a transmission housing for a motor vehicle transmission, the transmission housing comprising an inside space for accommodating moving transmission components and a venting arrangement for venting the inside space relative to a surrounding atmosphere, the venting arrangement comprising a venting duct with a venting duct inlet on the inside space side. Furthermore, the invention relates to a motor vehicle transmission with moving transmission components.

BACKGROUND

The document DE 10 2019 204 907 A1 relates to a transmission for a utility vehicle with a transmission housing in which at least one venting arrangement is provided for equalizing the pressure between an inside space of the transmission housing and the surroundings of the transmission housing, which on the surroundings side has a vent fixed to a wall of the transmission housing, and where the vent is connected by way of at least one oil foam reducing duct to at least one inside space of the transmission housing. To ensure a particularly simple design and inexpensive venting arrangement, in the document DE 10 2019 204 907 A1 it is proposed to provide as the venting duct at least one first venting bore on the inside-space side and a second venting bore on the vent side, where the venting bores in their connecting area are arranged offset relative to their cross-section in such manner that a step-shaped transition is provided between the venting bores in the area where they are connected.

SUMMARY

The purpose of the present invention is to improve, structurally and/or functionally, a transmission housing of the type mentioned to begin with. Furthermore, the purpose of the present invention is to improve, structurally and/or functionally, a motor vehicle transmission of the type mentioned to begin with.

This objective is achieved with a transmission housing and with a motor vehicle transmission as disclosed herein. Advantageous embodiments and/or further developments will be apparent from the present disclosure.

The transmission housing is designed and/or can be arranged to be used as a transmission housing for a motor vehicle. The transmission housing has an inside space. The inside space is designed to accommodate moving transmission components. Unless otherwise indicated or unless it emerges from the context, in this case direction indications, in particular the terms “upper”, “lower”, “above”, “below”, “lateral”, “horizontal” and “vertical” refer to an arrangement of the transmission housing in a motor vehicle on a level and flat road. “Up”, “down”, “above”, “below” and “vertical” then refer to a direction perpendicular to the road. “Lateral” and “horizontal” refer to a direction parallel to the road.

The transmission housing can comprise a housing wall. The housing wall can be an outer wall of the housing or part of an inner wall. The transmission housing can have an intermediate wall. The intermediate wall can be connected fast to the housing wall. The intermediate wall can first be made separately from the housing wall and then connected fast to the housing wall, for example by screwing. The intermediate wall can be an inner wall of the housing or part of an inner wall of the housing. The intermediate wall can be plate-like. The inside space can comprise at least one functional space. The at least one functional space can be designed to contain a lubricant and/or coolant, in particular a transmission oil. The inside space can comprise a plurality of functional spaces. Functional spaces can be spatially separated from one another. Functional spaces can be spatially separated from one another by inner housing walls or parts of inner housing walls. Functional spaces can be connected with one another so as to communicate. The at least one functional space can be a main space. The main space can be designed and/or arranged so as to accommodate transmission gearsets and shifting elements. The at least one functional space can be an intermediate space. The intermediate space can be designed and/or arranged so as to accommodate a power take-off. The transmission housing, the housing wall and/or the intermediate wall can be produced in a casting process.

The transmission housing comprises a venting arrangement. The venting arrangement is designed and/or arranged so as to vent the inside space. The venting arrangement can be designed and/or arranged so as to vent a functional space. The venting arrangement is designed and/or arranged so as to vent a space relative to a surrounding atmosphere.

The venting arrangement comprises a venting duct. The venting duct can be designed and/or arranged to separate out coolant and/or lubricant, in particular transmission oil, from a venting flow. The venting duct can be designed and/or arranged for the purpose of stabilizing and de-foaming coolant and/or lubricant, in particular transmission oil, and/or returning it back into the collection space. The venting duct has a venting duct inlet on the inside-space side. The venting duct can be arranged on the collection-space side. The venting duct can have a venting duct outlet on the atmosphere side. The venting duct can have a circular cross-section. The venting duct can have a first venting duct section that extends at least approximately horizontally. The venting duct inlet can be arranged in the first venting duct section. The venting duct can have a second venting duct section. The venting duct outlet can be arranged in the second venting duct section. The first and second venting ducts can be at an angle relative to one another. The second venting duct section can extend at least approximately vertically. The venting duct, the first venting duct section and/or the second venting duct section can be in the form of bores.

The venting arrangement comprises a collection space. The collection space can be designed and/or arranged so as to collect coolant and/or lubricant, in particular transmission oil. The collection space can be designed and/or arranged so as to separate out coolant and/or lubricant, in particular transmission oil, from a venting flow. The collection space can be designed and/or arranged so as to stabilize and de-foam coolant and/or lubricant, in particular transmission oil, and/or to return it back into the inside space. The collection space is upstream from the venting duct inlet. The collection space can be upstream from the venting duct inlet in the venting direction. The collection space has a collection space outlet. The collection space outlet can be arranged on the venting-duct side or on the atmosphere side. The collection space outlet can have a rectangular or trapezium-shaped cross-section with rounded corners. The collection space can have a collection space inlet. The collection space inlet can be arranged on the throttle-duct side or the inner-space side. The collection space can have a half-shell-shaped volume. The collection space can have a floor section. The floor section can delimit the collection space at the bottom. The collection space can have a back section. The back section can delimit the collection space laterally. The back section can be arranged opposite the collection space outlet. The collection space can have a rim section. The rim section can delimit the collection space outlet.

The venting arrangement can comprise a throttle duct. The throttle duct can be designed and/or arranged so as to separate out coolant and/or lubricant, in particular transmission oil, from a venting flow. The throttle duct can be designed and/or arranged so as to stabilize and de-foam coolant and/or lubricant, in particular transmission oil, and return it back into the inside space. The throttle duct can be upstream from the collection space. The throttle duct can be upstream from the collection space in the venting direction. The throttle duct can have a throttle duct inlet and a throttle duct outlet. The throttle duct inlet can be arranged on the inside-space side. The throttle duct outlet can be arranged on the collection-space side or on the atmosphere side. The throttle duct can have an at least approximately constant cross-section. The throttle duct can have a circular cross-section. The throttle duct can have an inside width of around 1 mm to around 4 mm, in particular around 2 mm. The throttle duct can be straight. The throttle duct can be in the form of a bore.

The collection space outlet and the venting duct inlet can be arranged one above the other. The collection space outlet and the venting duct inlet can be interconnected. The collection space outlet can have a larger cross-section than the venting duct inlet. The collection space outlet can have a larger inside width than the venting duct inlet. The collection space outlet can have an average cross-section that corresponds to around 1.2 to around 2.5 times, in particular around 1.6 to around 2 times the cross-section of the venting duct inlet. Between the collection space outlet and the venting duct inlet a step may be formed.

The venting duct inlet can have a circumferential rim. The circumferential rim can project toward the collection space outlet. The circumferential rim can be formed between an inside surface of the venting duct and its end face. The circumferential rim can have an edge angle of around 90°. The circumferential rim can be sharp-edged and/or not rounded.

The throttle duct outlet can project into the collection space. The throttle duct outlet can project into the collection space under the venting duct inlet. The throttle duct outlet can project into the collection space in the floor section and/or in the back section. The throttle duct outlet can project into the collection space in a lowest section and/or a section of the collection space as far away as possible from the collection space outlet. The throttle duct inlet can be arranged under the throttle duct outlet. The throttle duct can extend obliquely downward from the collection space toward the inside space.

The throttle duct inlet and/or the throttle duct outlet can have a circumferential rim. The circumferential rim of the throttle duct inlet can project toward the inside space. The circumferential rim of the throttle duct outlet can project toward the collection space. The circumferential rim can be formed between an inner surface of the throttle duct and an end face. At least in some parts the circumferential rim can have an edge angle of around 90°. At least in some parts the circumferential edge can be sharp-edged and/or not rounded.

The collection space can be formed in the wall of the housing. The collection space can be formed in the intermediate wall of the housing. The collection space can be integrated into the housing wall or the intermediate wall. During the production of the housing wall or the intermediate wall the collection space can be produced at the same time. The housing wall or the intermediate wall can be produced together with the collection space. The collection space can be produced by a casting process. After the housing wall or the intermediate wall have been produced, the collection space can be attached to the housing wall or the intermediate wall. The collection space can be made by a material-removing process.

The motor vehicle transmission can be a truck transmission, a utility vehicle transmission, an agricultural machine transmission, a building machine transmission, an omnibus transmission or a passenger car transmission. The motor vehicle transmission comprises moving transmission components. The moving components can be transmission gearsets and shifting elements. The motor vehicle transmission comprises the transmission housing.

In summary and in other words the invention provides, among other things, a venting system with an integrated oil collector. The oil collector can also be called an oil collection space or a collection space. By virtue of a throttle bore, an oil stream to be produced can be throttled and captured by an extra oil collection space in the transmission. The oil collection space can be integrated either in a cast housing or in some other component such as an intermediate plate (front wall of the transmission).

By means of the invention, an operation-induced pressure increase in the inside space is reduced or prevented. An escape of coolant and/or lubricant, in particular transmission oil, from the inside space is reduced or prevented. The functionality is improved. Effort and expense, for example the effort and expense of assembly and/or maintenance, are reduced. A venting system such as a membrane vent can be omitted.

BRIEF DESCRIPTION OF THE DRAWINGS

Below, example embodiments of the invention are described in greater detail with reference to the figures which show, schematically and as examples.

DETAILED DESCRIPTION

Figure 1:
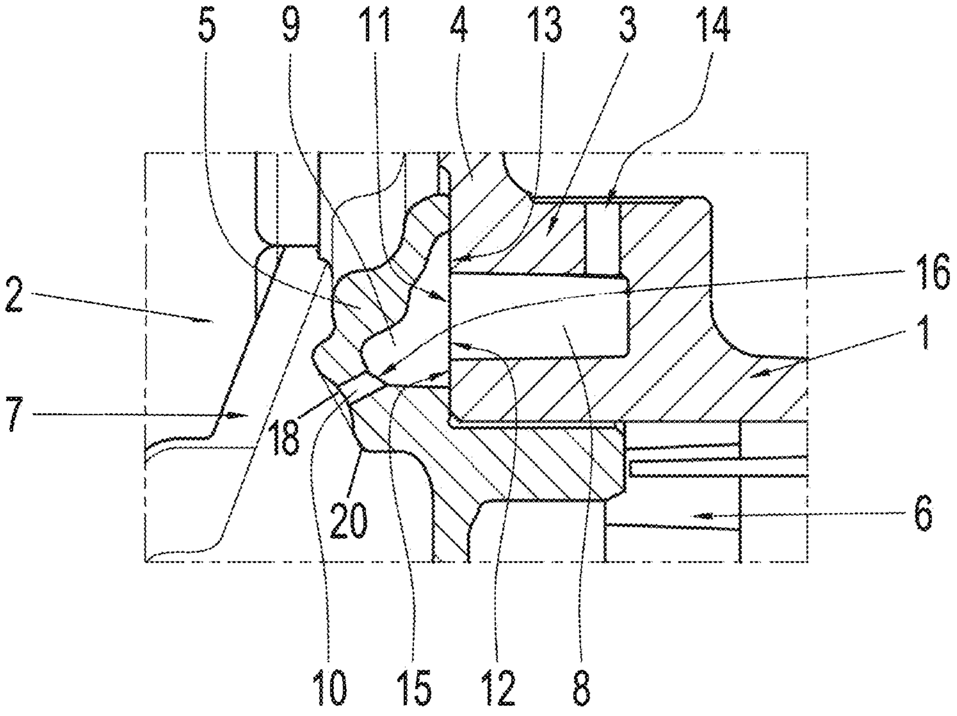
FIG. 1: Part of a transmission housing with an inside space and a venting arrangement having a venting duct, a collection space, and a throttle duct.

FIG. 1 shows a transmission housing 1 with an inside space 2 and a venting arrangement 3 in a position corresponding to an arrangement of the transmission housing 1 in a motor vehicle on a non-inclined, flat road. The transmission housing 1 is designed to be used as a motor vehicle transmission housing and comprises a housing wall 4 and an intermediate wall 5. With the help of the intermediate wall 5 the inside space 2 is divided into a main space 6 which is designed to accommodate transmission gearsets and shifting elements, and an intermediate space 7 which, for example, is designed to accommodate a power take-off. The main space 6 and the intermediate space 7 are designed to contain transmission oil and are connected to communicate with one another. During the operation of the motor vehicle transmission the transmission oil is agitated and foamed comparatively severely in the main space 6, while in the intermediate space 7 the oil is not so agitated.

Figure 2:
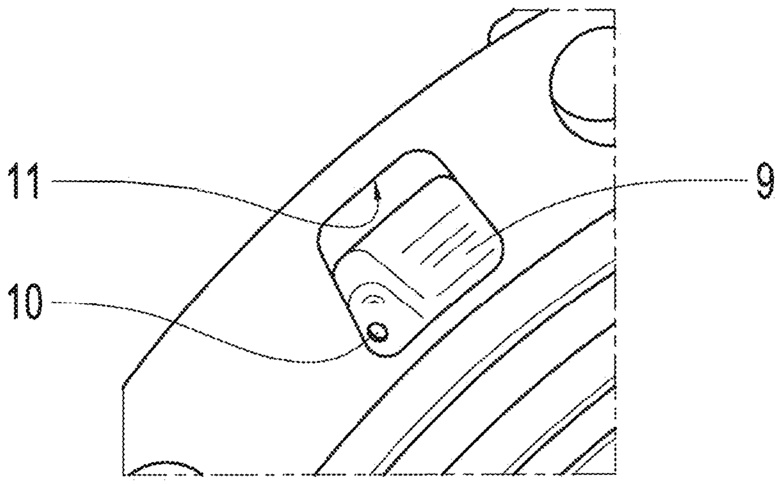
FIG. 2: Detailed view of a collection space.

The venting arrangement 3 comprises a venting duct 8, a collection space 9 upstream from the venting duct 8, and a throttle duct 10 upstream from the collection space 9. The throttle duct 10 is arranged in the intermediate wall 5 and, starting from the intermediate space 7, extends upward and obliquely into the collection space 9. The collection space 9 is integrated in the intermediate wall 5 produced by a casting process, and has a half-shell-like volume open toward the venting duct 8 with a floor section, a back section, and a collecting space outlet 11. The venting duct has a venting duct inlet 12 with a sharp-edged circumferential rim 13, a horizontally extending first venting duct section, a vertically extending second venting duct section, and a venting duct outlet 14. The cross-section of the collection space outlet 11 is substantially larger than that of the venting duct inlet 12, so that the circumferential rim 13 projects completely clear and a step 15 is formed between the collection space outlet 11 and the venting duct inlet 12. The throttle duct 10 has a throttle duct outlet 16. With its throttle duct outlet 16 the throttle duct 10 opens under the venting duct inlet 12 into the collection space 9 at its lowest point, as far as possible away from the collection space outlet 11. A circumferential rim 20 around the throttle duct inlet 18 projects into the inside space 2. FIG. 2 shows the collection space 9, looking through the collection space outlet 11 at the back section and the throttle duct 10 opposite.

During the operation of the motor vehicle transmission, when the pressure in the inside space 2 undergoes an operation-induced pressure increase, venting takes place starting from the intermediate space 7, first via the throttle duct 10, into the collection space 9. Owing to the pressure difference brought about by the throttle effect, already during this only a little transmission oil is carried over, the transmission oil carried over collects in the collection space 9, and the rising course of the throttle duct 10 enables or assists a flow of transmission oil back into the intermediate space 7. Thereafter, a venting flow streams past the circumferential rim 13 into the venting duct 8 and, with a change of direction in opposition to gravity, upward through the first venting duct section and the second venting duct section, to the venting duct outlet 14. Thanks to the effective transmission oil retention or return flow of the venting arrangement 3 there is no need for a separate membrane vent at the venting duct outlet 14.

INDEXES

1 Transmission housing
2 Inside space
3 Venting arrangement
4 Housing wall
5 Intermediate wall
6 Main space
7 Intermediate space
8 Venting duct
9 Collection space
10 Throttle duct
11 Collection space outlet
12 Venting duct inlet
13 Circumferential rim
14 Venting duct outlet
15 Step
16 Throttle duct outlet
18 Throttle duct inlet
20 Circumferential rim

The invention claimed is:

1. A transmission housing for a motor vehicle transmission, the transmission housing comprising:

a housing wall defining an inside space for accommodating moving components;

an intermediate wall in the inside space, wherein the intermediate wall and the housing wall define a collection space configured to separate transmission oil from a venting flow; and a venting arrangement configured for venting the inside space relative to a surrounding atmosphere, the venting arrangement comprising:

a venting duct with a venting duct inlet on an inside of the housing wall, wherein the collection space is upstream from the venting duct inlet and has a collection space outlet connected to the venting duct inlet;

wherein the collection space outlet has a cross-sectional area that is larger than a cross-sectional area of the venting duct inlet;

wherein the intermediate wall defines a throttle duct between the inside space and the collection space, the throttle duct having a throttle duct inlet communicating with the inside space and a throttle duct outlet communicating with the collection space, wherein the throttle duct extends upward and obliquely into the collection space; and wherein the collection space expands in cross-sectional size from the throttle duct outlet to the collection space outlet.

2. The transmission housing according to claim 1, wherein the venting duct inlet is surrounded by a circumferential rim that projects into the collection space and is spaced from the collection space outlet.

3. The transmission housing according to claim 1, wherein the collection space has a back section spaced from and opposite the venting duct inlet.

4. The transmission housing according to claim 1, wherein the throttle duct outlet opens into the collection space at a location that is vertically below the venting duct inlet.

5. The transmission housing according to claim 1, wherein the collection space comprises a floor section and a back section spaced from and opposite the venting duct inlet, and wherein the throttle duct outlet opens into the collection space through the floor section and/or through the back section.

6. The transmission housing according to claim 1, wherein the throttle duct inlet is arranged lower than the throttle duct outlet.

7. The transmission housing according to claim 1, wherein a circumferential rim around the throttle duct inlet projects into the inside space.

8. The transmission housing according to claim 1, wherein the collection space is formed within the housing wall.

9. The of claim 1, wherein the collection space outlet has a cross-sectional area that is 1.6 to 2 times larger than a cross-sectional area of the venting duct inlet.

10. A motor vehicle transmission comprising:

the transmission housing according to claim 1.

* * * * *